(12) United States Patent
Wu et al.

(10) Patent No.: US 6,625,725 B1
(45) Date of Patent: Sep. 23, 2003

(54) SPECULATIVE REUSE OF CODE REGIONS

(75) Inventors: Youfeng Wu, Palo Alto, CA (US); Jesse Fang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/470,113

(22) Filed: Dec. 22, 1999

(51) Int. Cl.$^7$ .............................. G06F 9/44; G06F 9/30
(52) U.S. Cl. .................. 712/245; 712/248; 712/228; 717/165; 717/145; 717/131; 709/108; 709/314
(58) Field of Search .................. 712/216, 217, 712/205, 227, 200, 207, 245, 218, 248, 228; 711/133, 137; 703/22; 717/131, 140, 145, 146, 141, 165; 709/315, 314, 108

(56) References Cited

U.S. PATENT DOCUMENTS 5,845,101 A * 12/1998 Johnson et al. ............. 712/207
5,845,103 A * 12/1998 Sodani et al. ............... 712/216

OTHER PUBLICATIONS

Connors, D.A., et al., "Compiler–Directed Dynamic Computation Reuse: Rationale and Initial Results", *Proceedings of the 32nd Annual International Symposium on Microarchitecture (MICRO)*, 12 pgs., (Nov. 1999).
Gallagher, D.M., et al., "Dynamic Memory Disambiguation Using the Memory, Conflict Buffer", *ASPOLS–VI Proceedings, vol. 29*, pp. 183–193, (Nov. 1994).
Tsia, J., et al., "The Superthreaded Processor Architecture", 1–40.
Vijaykumar, T.N., et al., "Task Selection for a Multiscalar Processor", *31st International Symposium on Microarchitecture*, 12 pgs., (Dec. 1998).
Calder, B., et al., "Value Profiling", *IEEE, Proceedings of Micro–30*, 11 pgs., (Dec. 1–3, 1997).
Steffan, J.G., et al., "Architectural Support for Thread–Level Data Speculation", *Computer Science Technical Report*, Computer Science Department School of Computer Science, Carnegie Mellon University, CMU–CS–97–188, 1–41, (Nov. 1997).
Steffan, J.G., et al., "The Potential for Using Thread–Level Data Speculation to Facilitate Automatic Parallelization", *HPCA–4*, 1–12, (Feb. 1–4, 1998).
Sodani, A., et al., "Dynamic Instruction Reuse", *ACM*, (1997).

\* cited by examiner

*Primary Examiner*—Daniel H. Pan
(74) *Attorney, Agent, or Firm*—Schwegman, Lundberg, Woessner & Kluth, P.A.

(57) ABSTRACT

A speculative code reuse mechanism includes a reuse buffer, a main processing core and a reuse checking core. The reuse buffer includes inputs and outputs of previously executed instances of code reuse regions. Aliased reuse regions are regions that access memory locations that may change between executions of the region. When an aliased code reuse region is encountered and a matching instance exists in the reuse buffer, the main core speculatively executes code occurring after the reuse region, while the reuse checking core executes code from the reuse region to verify the matching instance. If the matching instance is verified, the speculative execution is committed, and if the matching instance is not verified, the speculative execution is squashed.

20 Claims, 8 Drawing Sheets

SPECULATIVE REUSE OF CODE REGIONS

FIELD OF THE INVENTION

The present invention relates generally to microprocessors, and more specifically to microprocessors capable of reusing regions of software code.

BACKGROUND OF THE INVENTION

Modern software programs include many instructions that are executed multiple times each time the program is executed. Typically, large programs have logical "regions" of instructions, each of which may be executed many times. When a region is one that is executed more than once, and the results produced by the region are the same for more than one execution, the region is a candidate for "reuse." The term "reuse" refers to the reusing of results from a previous execution of the region.

For example, a reuse region could be a region of software instructions that, when executed, read a first set of registers and modify a second set of registers. The data values in the first set of registers are the "inputs" to the reuse region, and the data values deposited into the second set of registers are the "results" of the reuse region. A buffer holding inputs and results can be maintained for the region. Each entry in the buffer is termed an "instance." When the region is encountered during execution of the program, the buffer is consulted and if an instance with matching input values is found, the results can be used without having to execute the software instructions in the reuse region. When reusing the results is faster than executing the software instructions in the region, performance improves. Such a buffer is described in: Daniel Connors & Wen-mei Hwu, "Compiler-Directed Dynamic Computation Reuse: Rationale and Initial Results," Proceedings of the 32nd Annual International Symposium on Microarchitecture (MICRO), November 1999.

The example of the previous paragraph works well when the results are a function of nothing but the input values. When the results are a function of more than the input values, reuse is more complicated. For example, if a memory load instruction occurs in the reuse region, the results can be a function of the input values as previously described, and can also be a function of the data value loaded from the memory. If the memory load instruction accesses a memory location that is changed by a memory update instruction outside the region, then the region is said to be "aliased."

Aliased regions present a problem for reuse. Even when a matching instance exists in the reuse buffer, the reuse instance may not be usable because the aliased memory load may read a different value that causes the correct results to differ from the results in the instance. Connors and Hwu present an "invalidate" instruction that invalidates the reuse buffer instances for a region such that they cannot be reused. The invalidate instruction is placed after memory update instructions capable of writing to the same location that the aliased load instruction accesses, but it can be difficult to find all of the memory update instructions that may update the aliased address. Even if all of the appropriate instructions are found, this approach is conservative in part because the memory update instruction may update an address other than the aliased address, but the invalidate instruction will invalidate the region nonetheless.

For the reasons stated above, and for other reasons stated below which will become apparent to those skilled in the art upon reading and understanding the present specification, there is a need in the art for an alternate method and apparatus for code reuse.

SUMMARY

In one embodiment, a processing apparatus includes a first processor core configured to speculatively execute instructions based on results from an instance of a reuse region, and a second processor core configured to verify the results from the instance of the reuse region. The processing apparatus can also include a thread queue coupled between the first processor core and the second processor core, where the thread queue is configured to communicate a thread structure describing the reuse region from the first processor core to the second processor core.

In another embodiment, a processing apparatus includes a reuse buffer configured to hold instances of reuse regions, and also includes a reuse invalidation buffer configured to have entries that point to at least one of the instances of reuse regions held in the reuse buffer.

In another embodiment, a computer-implemented method for annotating a software program includes identifying a reuse region within the software program, determining whether the reuse region is aliased, and when the reuse region is aliased, adding a speculative reuse instruction to the reuse region.

DESCRIPTION OF THE EMBODIMENTS

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

The method and apparatus of the present invention provide a mechanism for reusing results of code regions. In some embodiments, a dual core processor executes code in parallel. When an aliased reuse region is encountered, a "main" processor core speculatively executes the code following the reuse region using results from a matching instance in the reuse buffer, while a "checking" core executes the code in the reuse region to verify the results used in the speculative execution. If the results verify correctly, then the execution of the aliased reuse region is successfully bypassed. If the results do not verify correctly, the state of the checking core is copied to the main core, and the code executes as if the reuse region had been executed normally by the main core. Through the use of the dual core processor, aliased reuse regions are bypassed whenever possible, and are executed whenever necessary.

In other embodiments, a reuse invalidation buffer tracks activity of aliased memory locations. When an aliased memory location is written to, the reuse invalidation buffer causes the invalidation of instances or regions in the reuse buffer. The invalidated instances are instances of aliased reuse regions that include load instructions aliased to the memory location of interest. In these embodiments, aliased reuse regions can be treated as non-aliased, or "pure" reuse regions when the instances are valid.

In other embodiments, a dual core processor is combined with a reuse invalidation buffer. Pure reuse regions are reused whenever a matching instance is found; aliased reuse regions are treated as pure when an instance is valid; and invalidated instances of aliased reuse regions can still be reused as long as the checking core verifies the results from the instance being used.

Figure 1A:
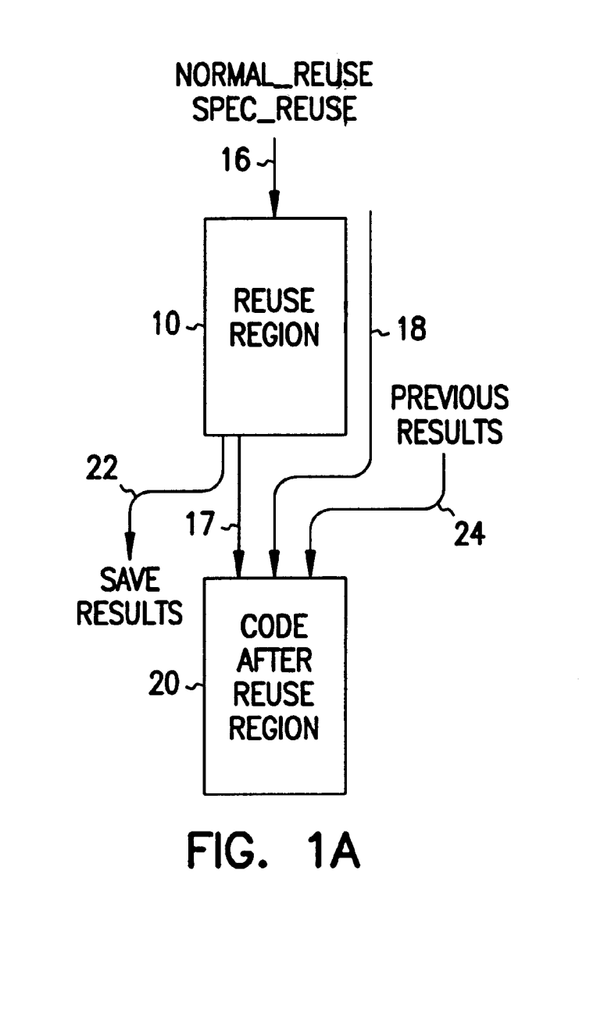
FIGS. 1A–1D show a code reuse region and a code region following the code reuse region in various execution scenarios.

FIG. 1A shows reuse region 10 followed by code region 20. Code region 20 logically follows reuse region 10, and does not necessarily physically follow reuse region 10. For example, code region 20 can include code that resides contiguous with reuse region 10 in memory, or can include code that does not reside contiguous with reuse region 10. Examples of non-contiguous regions include code in another function or code in another library.

Reuse region 10 is a code region designated by a compiler as a reuse region. When reuse region 10 is executed, as shown by path 16, results of the execution of reuse region 10 are stored, as shown by path 22, in an instance in a reuse buffer (not shown). When region 10 is encountered and a matching instance is found in the reuse buffer, previous results are reused, as shown by path 24, and code region 20 may be able to be executed immediately, as shown by path 18.

FIG. 1A also shows two processor instructions, "normal_ reuse," and "spec_reuse." "Spec_reuse" is short for "speculative reuse." When reuse region 10 is aliased, the compiler inserts a spec_reuse instruction at the beginning of reuse region 10. When reuse region 10 is not aliased, or "pure," the compiler inserts a normal_reuse instruction at the beginning of reuse region 10. The compiler that compiles reuse region 10 determines whether reuse region 10 is aliased. This can be accomplished by searching for memory load instructions within reuse region 10. If reuse region 10 does not have memory load instructions, or only has memory load instructions that load from read-only memory, then reuse region 10 is not aliased.

For completeness, FIG. 1A shows many different possible paths. Not all of the paths listed are necessarily taken when a processor encounters reuse region 10. During execution, a processor decodes the normal_reuse or spec_reuse instruction at the beginning of reuse region 10, searches the reuse buffer and performs accordingly. Some possible scenarios are shown in FIGS. 1B–1D.

Figure 1B:
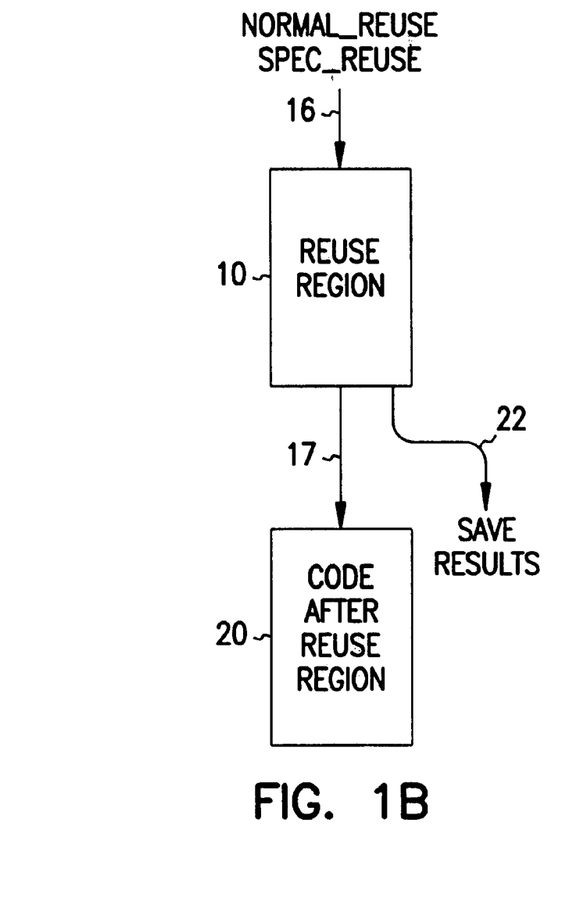

FIG. 1B corresponds to an execution of reuse region 10 when a matching instance does not exist in the reuse buffer. FIG. 1B is shown with both the normal_reuse instruction and the spec_reuse instruction. This does not imply that both instructions exist in reuse region 10, but rather that either instruction could exist in reuse region 10 and still have the scenario occur as shown in FIG. 1B. When a processor encounters reuse region 10 with either the normal_reuse or the spec_reuse instruction, and no matching instance exists in the reuse buffer, reuse region 10 is executed as shown by path 16 in FIG. 1B. After reuse region 10 is executed, an instance in the reuse buffer can be created, and the results of the execution of reuse region 10 can be saved in the instance as shown by path 22. This is termed "memorization mode." During memorization mode, instances are created and saved in the reuse buffer for later use. The processor continues on by executing code region 20 as shown by path 17.

Figure 1C:
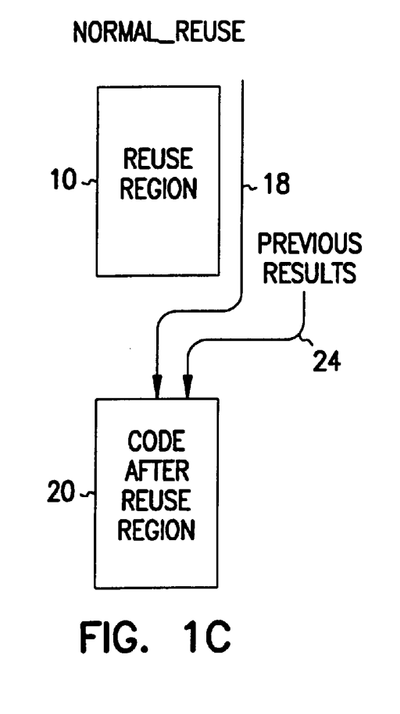

FIG. 1C shows a scenario where reuse region 10 is a pure reuse region and a matching instance exists in the reuse buffer. Because reuse region 10 is a pure reuse region, there is no concern that an aliased load may make an otherwise matching instance unusable. The results stored in the matching instance can be used and code region 20 can be executed directly. Reuse region 10 as shown in FIG. 1B can be identified as a pure reuse region by the normal_reuse instruction. When a matching instance is found, the previous results from the matching instance are reused as shown by path 24, and execution bypasses reuse region 10 and proceeds directly to region 20 as shown by path 18.

Figure 1D:
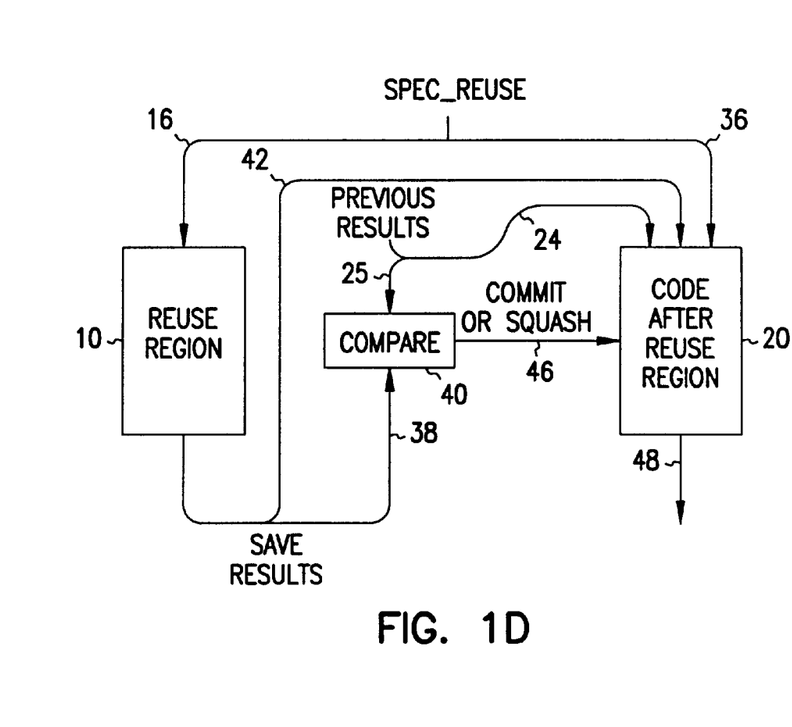

FIG. 1D shows a speculative execution scenario involving an aliased reuse region and a matching instance. Reuse region 10 as shown in FIG. 1D can be identified as an aliased region by the spec_reuse instruction. When the processor encounters the spec_reuse instruction and a matching instance is found, speculative execution begins. Reuse region 10 and code region 20 are executed in parallel as shown by paths 16 and 36. Like the scenario of FIG. 1C, code region 20 is executed using the previous results from the matching instance as shown by path 24, but in FIG. 1D, code region 20 is speculatively executed, whereas in FIG. 1C it is not.

The previous results used for the speculative execution of code region 20 may prove to be incorrect because of an aliased memory load within reuse region 10. Reuse region 10 is executed in parallel with code region 20 to verify that the previous results are still valid. If the previous results are still valid, then the speculative execution can become non-speculative, or be "committed," and if the previous results are not still valid, then the speculative execution is thrown away, or "squashed."

As reuse region 10 executes, new results are created as shown by path 38. The new results are provided to comparator 40, as are the previous results as shown by path 25. Comparator 40 compares the previous results and the new results. When comparator 40 determines that the previous results match the new results, the speculative execution of code region 20 is committed and is no longer speculative. When this occurs, the previous results have been successfully reused. From an execution time standpoint, the scenario just described appears much like that of FIG. 1C. Code region 20 is executed using previous results when reuse region 10 is encountered, and a performance gain is achieved by bypassing the execution of reuse region 10.

When comparator 40 determines that the previous results do not match the new results, the speculative execution of code region 20 is squashed. Code region 20 is then executed anew using the new results as just computed by reuse region 10, as shown by path 42. The new results can also be written to the reuse buffer to replace the instance that was found to be incorrect. From an execution time standpoint, the scenario just described appears much like that of FIG. 1B. Code region 20 is executed after reuse region 10, and new results from reuse region 10 can be saved in an instance for later use.

FIG. 1D is a logical diagram that includes mechanisms capable of implementation in hardware or software. In some embodiments, the entire implementation is in hardware. This provides a very fast and efficient implementation. In other embodiments, a mix of hardware and software is used. For example, comparator 40 can be implemented in a combination of dedicated hardware and software, such as state machines or microcoded blocks.

As previously mentioned, the compiler that compiled the reuse regions aids in the reuse of code by adding instructions to signal to the hardware that reuse is possible. Normal_ reuse and spec_reuse instructions have previously been described. In some embodiments, the compiler also adds "end_of_region" instructions to signal the end of a reuse region, and annotates some memory update and register update instructions as "live-out" instructions. Live-out instructions are those instructions whose results outlive the execution of the region and become outputs of the region. Examples of live-out instructions include register update instructions that update registers utilized outside the scope of the reuse region.

Figure 2:
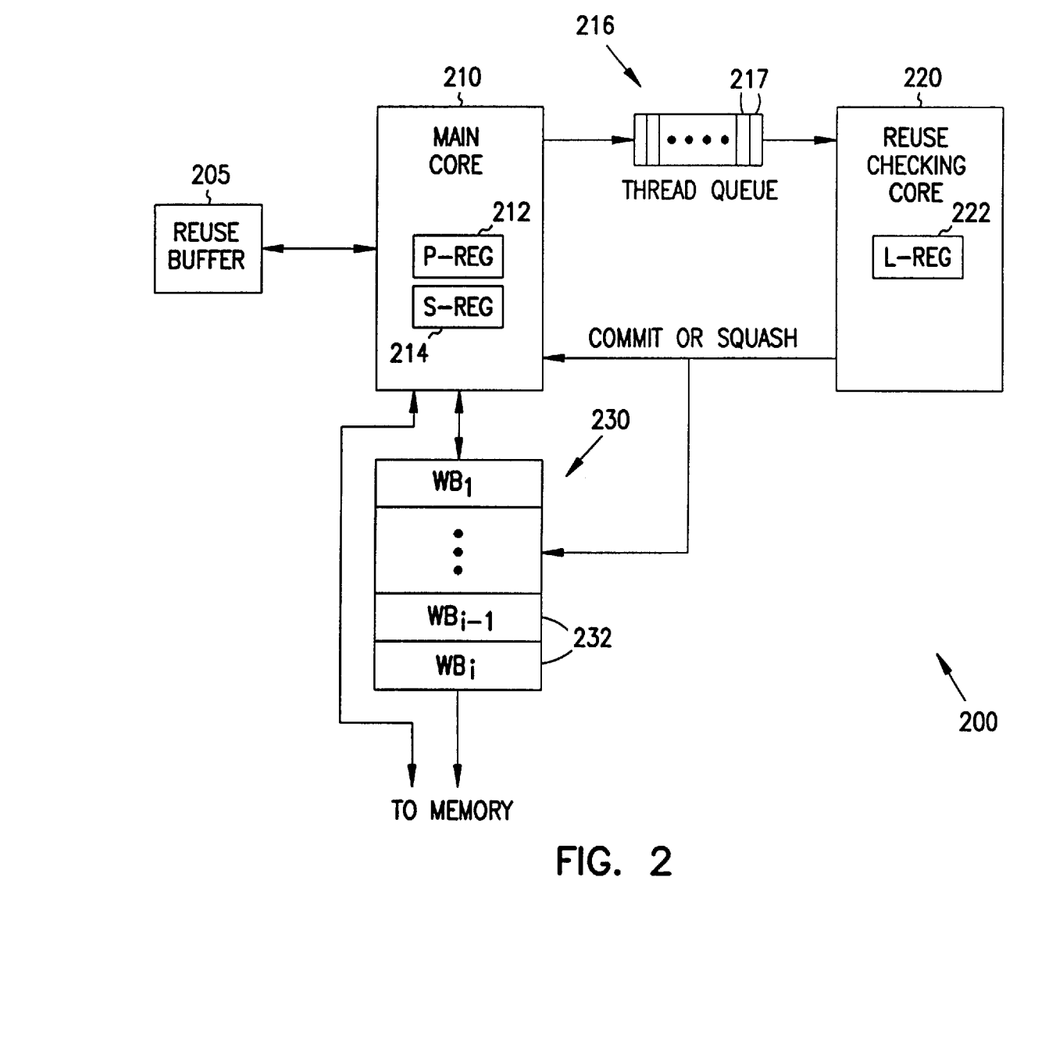
FIG. 2 shows a multi-threading microarchitecture.

FIG. 2 shows a multi-threading microarchitecture embodiment capable of supporting the speculative execution scenario of FIG. 1D. Embodiment 200 includes a dual core processor having main processing core 210, reuse checking core 220, thread queue 216, write-back buffer block 230, and reuse buffer 205. Embodiment 200 can be included within a processor such as a microprocessor, digital signal processor, microcontroller, or the like. Main core 210 includes a "persistent" register file shown as P-reg 212, which is used when main core 210 is in "non-speculative mode." Main core 210 also includes a "shadow" register file shown as S-reg 214, which is used when main core 210 is in "speculative mode." Speculative mode and non-speculative mode are discussed in more detail with respect to the threaded execution model below.

Reuse buffer 205 stores instances of reuse regions. Instances stored in reuse buffer 205 can be instances of pure or aliased reuse regions. Reuse buffer 205 can also include a reuse invalidation buffer, as is further explained with reference to FIGS. 3A and 3B below.

Write-back buffer block 230 includes a number of write-back buffers 232 each being identified by an index. Each of write-back buffers 232 includes a set of register values and memory updates capable of storing the results of instructions during speculative execution. When main core 210 is speculatively executing code, results are placed in one or more write-back buffers 232 until the execution is no longer speculative.

Reuse checking core 220 includes a "local" register file shown as L-reg 222 in FIG. 2. In some embodiments, P-reg 212, S-reg 214, and L-reg 222 all have the same structure. Main core 210 creates threads for execution in reuse checking core 220 and communicates them to reuse checking core 220 using thread queue 216. In some embodiments, each thread in thread queue 216 is specified by a "thread structure" shown in FIG. 2 as thread structures 217. Each thread structure 217 represents a reuse region for reuse checking core 220 to check, and includes a starting instruction pointer (IP) address for the reuse region, and the input values and results from the matching instance being utilized for speculative execution. Thread structure 217 also includes the index of the current write-back buffer used to commit and squash speculatively executed instructions, and the IP address of the instruction after the reuse region.

Embodiment 200 uses a threaded execution model. Each program starts with main core 210 executing instructions in non-speculative mode. When in nonspeculative mode, P-reg 212 is used to store register values, and memory updates are directly committed. Write-back buffer block 230 is not used when main core 210 is executing in non-speculative mode.

Main core 210 enters speculative mode when a spec_reuse instruction is encountered in a program, marking the beginning of an aliased reuse region, and a matching instance is found in reuse buffer 205. Main core 210 creates a new thread for execution of the code in the reuse region and places a thread structure describing the new thread into thread queue 216. Main core 210 then copies the contents of P-reg 212 to S-reg 214 and speculatively executes the code occurring after the reuse region using results from the matching instance. During speculative execution, main core 210 accesses S-reg 214 and sends register updates and memory updates to the current write-back buffer 232.

Main core 210 may encounter other spec_reuse instructions during speculative execution. Each spec_reuse instruction causes a new thread to be created and a thread structure to be entered into the thread queue. The speculative execution between two consecutive reuse instructions that spawn new threads is termed a "speculation region." Each speculation region uses a separate write-back buffer 232, and each write-back buffer can be committed individually depending on the outcome of the thread spawned by the first reuse instruction in the speculation region.

When main core 210 creates a new thread while in speculative mode, it marks the end of the current write-back buffer, and continues speculative execution using the next write-back buffer. For example, if main core 210 is in speculative mode and is using write-back buffer $WB_{i-1}$ when a spec_reuse instruction is encountered, main core 210 marks the end of write-back buffer $WB_{i-1}$ and continues speculative execution using write-back buffer $WB_i$.

Reuse checking core 220 repeatedly fetches thread structures from thread queue 216 and executes the corresponding threads. When reuse checking core 220 fetches a thread structure from thread queue 216, the instance input values are copied into L-reg 222, and execution starts from the starting IP address specified in the thread structure. When the end-of-region instruction is encountered, reuse checking core 220 compares the instance results provided in the thread structure with the actual results produced. If the values match, reuse checking core 220 sends a "commit" request to main core 210. The commit request takes the form of "commit i," where i is the index of the write-back buffer that was stored in the thread structure that defined the thread to be executed by reuse checking core 220.

When main core 210 receives a request to commit, it commits all the results in the write-back buffer indexed by i to memory and to P-reg 212. $WB_i$ is then made available for use, and main core 210 switches to non-speculative mode if $WB_i$ was the only write-back buffer in use. If more write-back buffers are in use, then main core 210 remains in speculative mode.

If reuse checking core 220 finds that the results of the thread are different from those in the thread structure, it sends a request to main core 210 to squash the speculative execution. The squash request takes the form of "squash ip," where ip is the IP for the instruction after the reuse region in the thread structure. When main core 210 receives a squash request, it first squashes all the write-back buffers. It then copies the output register values in the thread structure to P-reg 212 and resumes execution at the instruction pointed to by ip. Main core 210 then executes in non-speculative mode. Reuse checking core 220 may also update the corresponding reuse instance with the new result values.

Embodiment 200 has been described with two processing cores: main core 210; and reuse checking core 220. Other embodiments include more than two cores. For example, some embodiment include multiple reuse checking cores. In these embodiments, the main core can assign threads to more than one reuse checking core. This allows more reuse checking to be performed in parallel.

Figure 3A:
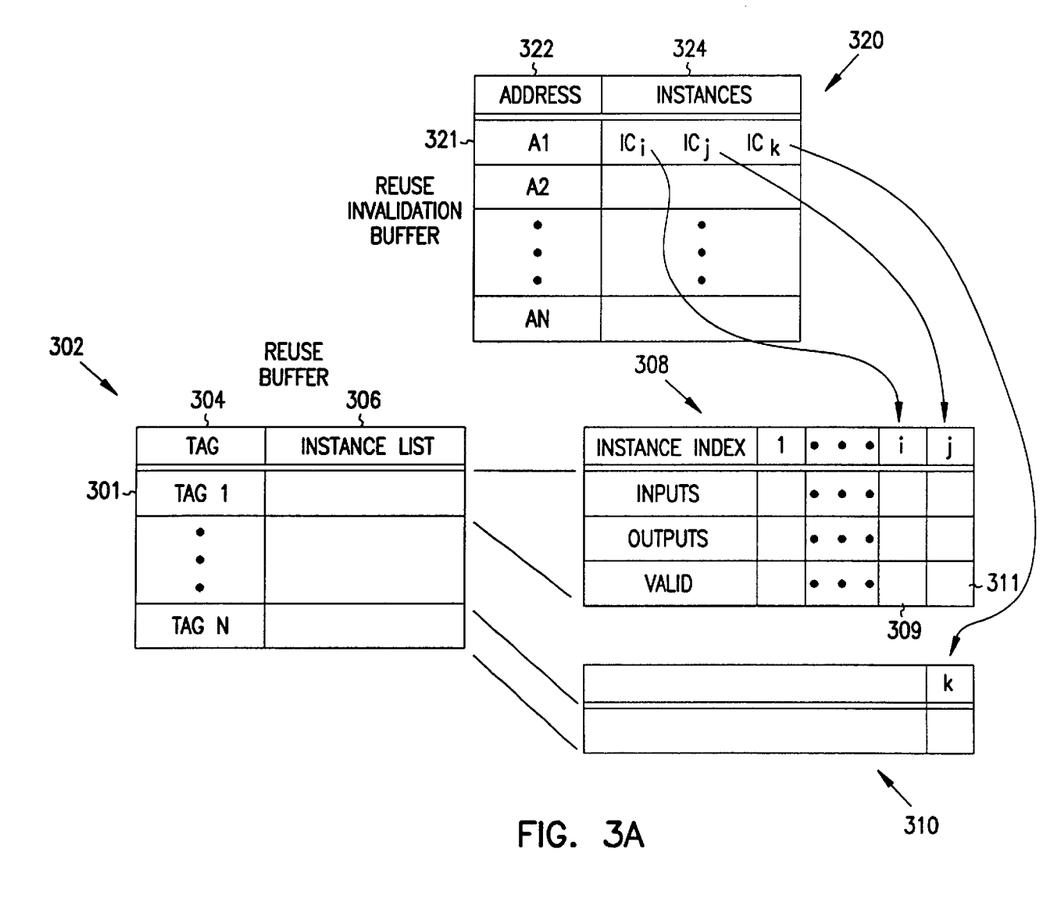
FIGS. 3A and 3B show embodiments of a reuse buffer and a reuse invalidation buffer.

FIG. 3A shows a reuse buffer and a reuse invalidation buffer in accordance with an embodiment of the invention. FIG. 3A shows reuse buffer 302 and reuse invalidation buffer 320. Reuse buffer 302 is a reuse buffer for use in a multi-threading microarchitecture, such as reuse buffer 205 (FIG. 2). Both reuse buffer 302 and reuse invalidation buffer 320 can be used together as a reuse buffer in a multi-threading microarchitecture, such as reuse buffer 205.

Reuse buffer 302 includes multiple entries, each entry having a tag field 304, and an instance list 306. Tag field 304 uniquely identifies reuse regions that have instance lists included within reuse buffer 302. For example, entry 301 has a tag field value of "TAG1," and the corresponding instance list is shown in an exploded view as instance list 308. Instance list 308 includes a number of reuse instances for the reuse region corresponding to entry 301 in reuse buffer 302. Each entry in instance list 308 includes an index for a reuse invalidation buffer, input values, output values, and a valid flag. In some embodiments, other fields are included in instance lists, such as fields carrying least recently used information for replacement purposes. Each instance in instance list 308 has a unique instance index, allowing each instance to be individually identified.

Reuse invalidation buffer 320 includes a number of entries, each having a value for address field 322, and instances field 324. Address field 322 holds memory addresses corresponding to aliased memory locations accessed by aliased load instructions within aliased reuse regions. Instances field 324 holds instance indices that operate as pointers that point to reuse instances held within instance list 306 of reuse buffer 302.

When a software program is compiled, the compiler identifies memory load instructions within reuse regions as aliased or non-aliased. The first time each reuse region is encountered during the execution of the program, memory load instructions that are marked as aliased load instructions have the corresponding memory address stored in an entry of reuse invalidation buffer 320. This creates new entries in reuse invalidation buffer 320. New entries can also be created during execution of the program if previous entries have been invalidated. Each time an instance is memorized, its instance index is placed in instances field 324. The result is a list of all instances of aliased reuse regions that access the aliased memory address in the corresponding entry of reuse invalidation buffers 320.

In some embodiments, when entries are made in reuse invalidation buffer 320, indices that point to the reuse invalidation buffer entries are stored in reuse instances of the reuse buffer. When reuse instances are invalidated, reuse invalidation buffer entries can also be invalidated or removed.

Each time a memory update instruction, such as a store instruction, is encountered in a program, reuse invalidation buffer 320 is consulted to determine if the memory location accessed is an aliased memory location that will cause a reuse instance to become invalidated. When the address is found within reuse invalidation buffer 320, the corresponding instances listed in instances field 324 are invalidated in instance list 306 of reuse buffer 302. For example, if a memory store instruction that accesses memory location "A1" is executed, reuse invalidation buffer 320 is searched and matching entry 321 is found. Instances listed include instances identified by indices I, j, and k. Instances corresponding to indices i and j reside in instance list 308, and are invalidated by setting valid flags 309 and 311. The instance corresponding to index k resides in instance list 310, which is an instance list for a different reuse region. When one aliased memory location is accessed by more than one aliased reuse region, as is the case with address "A1" in FIG. 3A, a single entry in reuse invalidation buffer 320 can be used to invalidate instances for more than one reuse region.

In some embodiments where both reuse buffer 302 and reuse invalidation buffer 320 are used as a reuse buffer in a multi-threaded microarchitecture, non-invalidated reuse instances of aliased reuse regions can be used with non-speculative execution as if the region were non-aliased. Even though a reuse region may be aliased, reuse instances created since the last update of the aliased memory location can be utilized as if the aliased reuse region were a pure reuse region. Reuse instances created prior to the last update of the aliased memory location may still be usable, and can benefit from the speculative execution described with respect to FIG. 2.

Figure 3B:
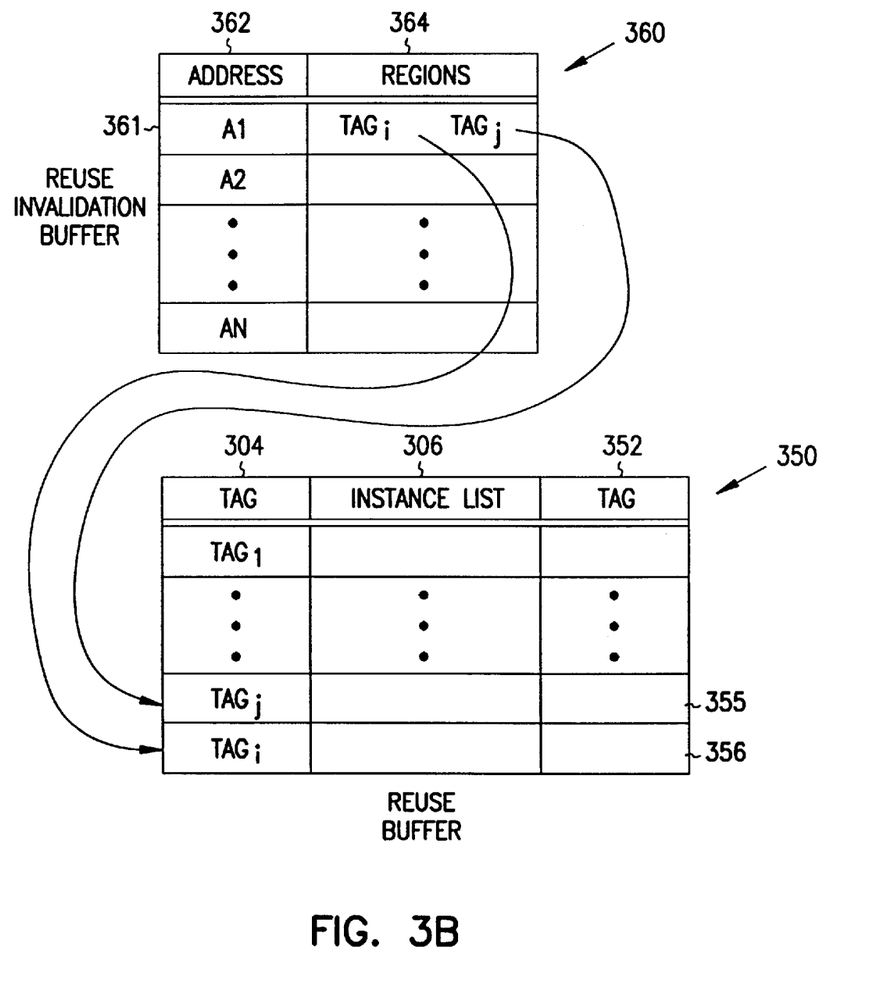

The embodiment shown in FIG. 3A provides for invalidation of individual reuse instances. The embodiment shown in FIG. 3A provides for invalidation of entire reuse regions rather than individual reuse instances. FIG. 3B shows reuse buffer 350 and reuse invalidation buffer 360. Reuse buffer 350 includes tag field 304 and instance list 306, and also includes valid flag 352. Reuse invalidation buffer 360 includes address field 362 and regions list 364. Address field 362 includes aliased memory addresses in the same manner as reuse invalidation buffer 320 (FIG. 3A). Regions list field 364 includes a list of reuse regions included within reuse buffer 350. When a memory location at an aliased address is updated, the corresponding regions in reuse buffer 350 are invalidated. For example, when a store instruction to address "A1" is executed, reuse invalidation buffer 360 is searched and entry 361 is found. Regions having indices i and j are listed in entry 361. They point to reuse regions 355 and 356 of reuse buffer 350. The corresponding valid flags can be set to mark the reuse regions as invalid.

The combination of reuse buffer 350 and reuse in validation buffer 360 allow some aliased reuse regions to be treated as if they were pure reuse regions. When an aliased reuse region is encountered in a program, and a valid matching instance is found in reuse buffer 350, the instance may be reused as if the reuse region were a pure reuse region. If the matching instance is marked as invalid, the results listed in the matching instance may still be usable. Whether or not the results are usable can be determined by speculative execution using a multi-threading microarchitecture such as that shown in FIG. 2.

Buffers and lists shown in FIGS. 3A and 3B have labels shown above double lines. For example, reuse buffer (FIG. 3B) is shown with labels "TAG," "INSTANCE LIST," and "VALID." The labels are shown for illustrative purposes, and in some embodiments, are not physically included in the buffers and lists.

Figure 4A:
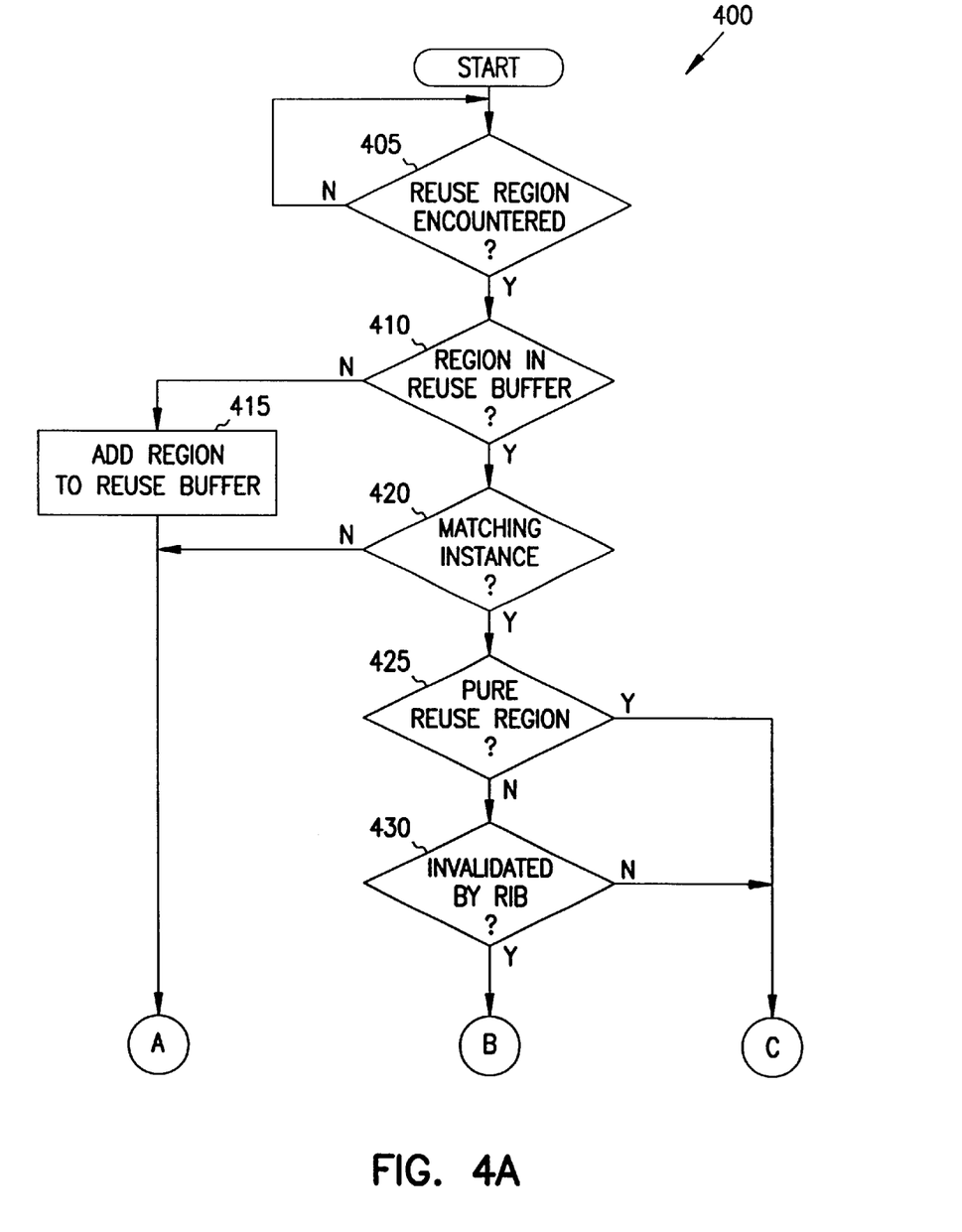
FIGS. 4A and 4B show a flowchart for a method of reusing results from reuse regions.
Figure 4B:
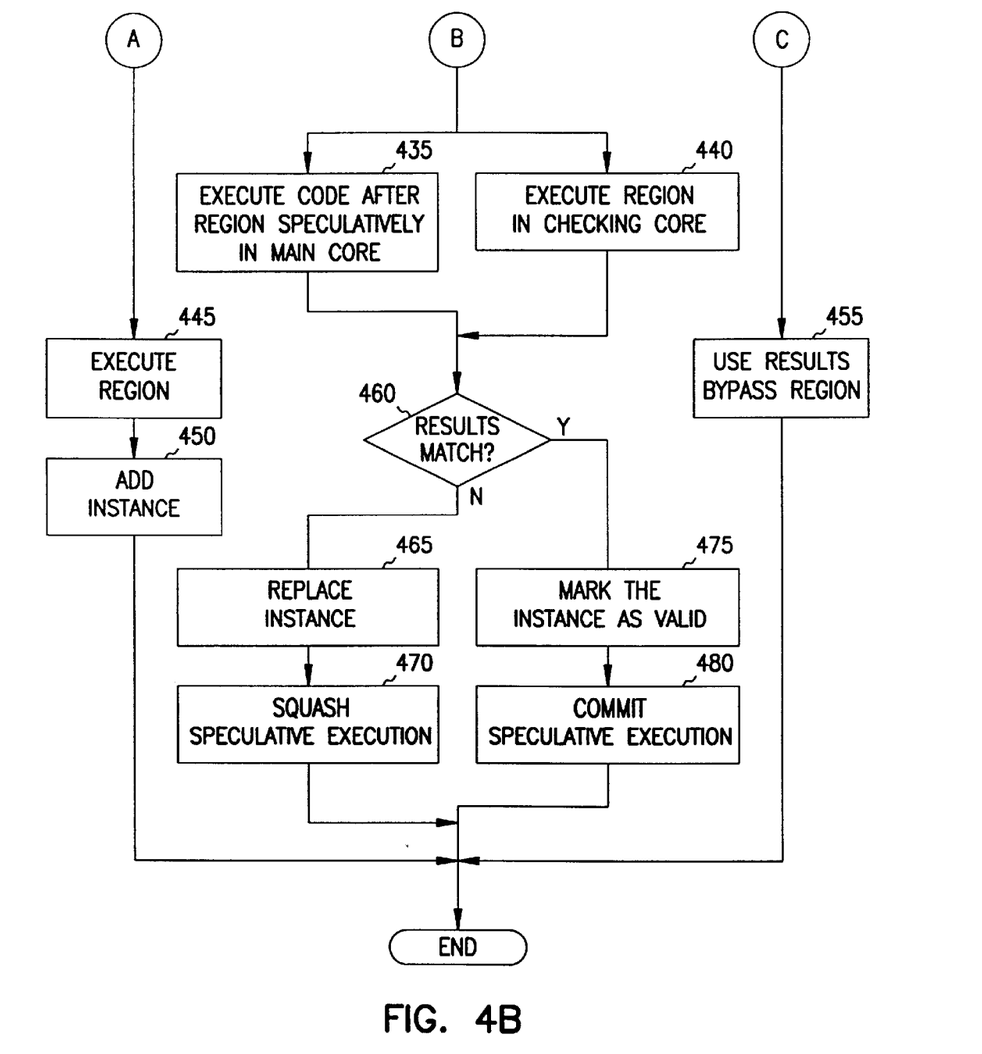

FIGS. 4A and 4B show a flowchart for a method of reusing results from reuse regions. Method 400 can be performed by a multi-threaded microarchitecture that includes a reuse invalidation buffer, such as reuse invalidation buffer 320 (FIG. 3A). Method 400 waits in decision block 405 until a reuse region is encountered. When a reuse region is encountered, decision block 410 determines if the reuse region is represented by an entry in a reuse buffer. If not, memorization mode is entered, an entry is made in the reuse buffer for the reuse region in block 415, the reuse region is executed in block 445, and an instance is added to the reuse buffer in block 450.

If the region is represented by an entry in the reuse buffer, decision block 420 determines whether a matching instance exists. A matching instance is an instance having input values identical to the input values for the current execution. If a matching instance is not found, memorization mode is entered and the region is executed in block 445. If a matching instance is found, reuse of previous results from the reuse region may be possible. Decision block 425 determines whether the reuse region is a pure reuse region. In some embodiments, this can be determined by the type of reuse instruction at the beginning of the reuse region. If the region is a pure reuse region, results from the matching instance are used and the region is bypassed as shown in block 455.

If the region is not a pure reuse region, decision block 430 determines whether or not the matching instance, or the region as a whole, has been invalidated by the action of a reuse invalidation buffer, such as reuse invalidation buffer 320 (FIG. 3A), or reuse invalidation buffer 360 (FIG. 3B). If the matching instance has not been invalidated, the reuse region can be treated as a pure reuse region. In this case, results from the matching instance are used and the region is bypassed as shown in block 455.

If the matching instance, or the region as a whole, has been invalidated by the action of the reuse invalidation buffer, blocks 435 and 440 are executed in parallel. In block 435, the results from the matching instance are used to speculatively execute code occurring after the region in a main processing core, such as main core 210 (FIG. 2). In block 440, the reuse region is executed in a checking core, such as reuse checking core 220 (FIG. 2). The results from blocks 435 and 440 are compared in decision block 460. If the results match, the instance can be marked as valid in block 475, and the speculative execution is committed in block 480.

If the results do not match, a new instance can be created replacing the old instance as shown in block 465, and the speculative execution performed in block 435 is squashed in block 470.

Figure 5:
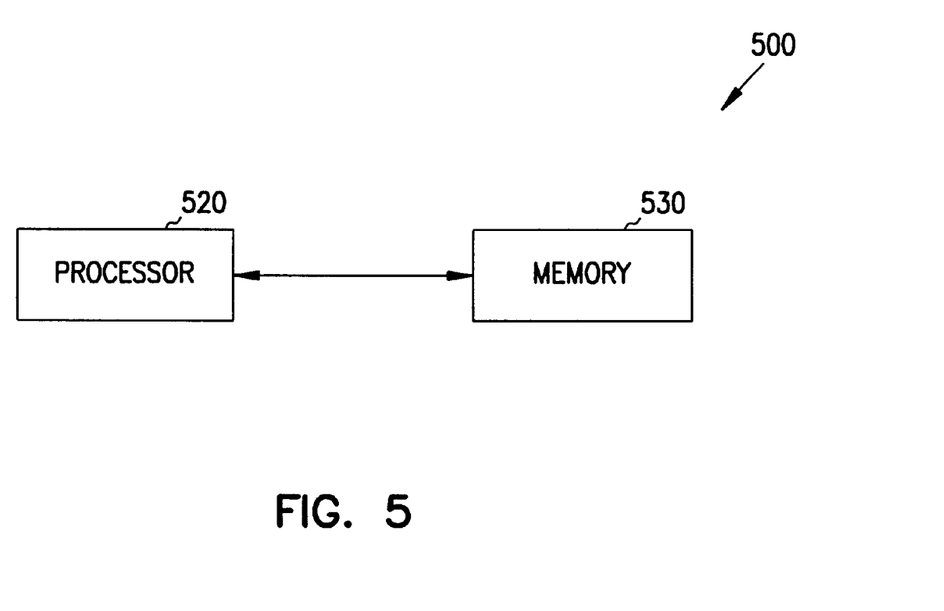
FIG. 5 shows a processing system in accordance with an embodiment of the invention.

FIG. 5 shows a processing system according to an embodiment of the invention. Processing system 500 includes processor 520 and memory 530. In some embodiments, processor 520 is a processor capable of compiling software and annotating reuse regions. Processor 520 can also be a processor capable of speculative execution of code, such as the dual core processor of FIG. 2. Processor 520 can be any type of processor capable of executing software, such as a microprocessor, digital signal processor, microcontroller, or the like. Processing system 500 can be a personal computer (PC), mainframe, handheld device, portable computer, set-top box, or any other system that includes software.

Memory 530 can be a hard disk, a floppy disk, random access memory (RAM), read only memory (ROM), flash memory, or any other type of machine medium readable by processor 520. Memory 530 can store instructions for performing the execution of the various method embodiments of the present invention such as method 400 (FIGS. 4A–4B) and the method discussed above for compiling and annotating of software that includes reuse regions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A processing apparatus comprising:
    a first processor core configured to speculatively execute instructions based on results from an instance of a reuse region;
    a second processor core configured to verify the results from the instance of the reuse region;
    at least one queue coupled between the first processor core and the second processor core, wherein the at least one queue comprises a thread queue configured to hold at least one thread structure describing the reuse region and the instance of the reuse region.

2. A processing apparatus comprising:
    a first processor core configured to speculatively execute instructions based on results from an instance of a reuse region;
    a second processor core configured to verify the results from the instance of the reuse region;
    a write-back buffer configured to hold results from speculatively executed instructions, and further configured to write back to the first processor core in response to verification of the results by the second processor core.

3. A processing apparatus comprising:
    a first processor core configured to speculatively execute instructions based on results from an instance of a reuse region, wherein the reuse region includes an aliased load instruction that accesses an aliased memory address;
    a second processor core configured to verify the results from the instance of the reuse region;
    a reuse buffer configured to hold the instance of the reuse region; and
    a reuse invalidation buffer configured to invalidate the instance of the reuse region in the reuse buffer responsive to a memory instruction that accesses the aliased memory address.

4. The processing apparatus of claim 3 wherein the reuse invalidation buffer includes:
    a reference to the aliased memory address; and
    a reuse instance index that points to the instance of the reuse region held in the reuse buffer.

5. A processing apparatus comprising:
    a first processor core configured to speculatively execute instructions from a software region beyond a reuse region;
    a thread queue coupled to the first processor core, the thread queue being configured to receive a thread structure describing the reuse region; and
    a second processor core coupled to the thread queue, the second processor core being configured to execute instructions from the reuse region.

6. The processing apparatus of claim 5 wherein the thread structure describes an instance of the reuse region with information including:

reuse region instance input information; and reuse region instance output information.

7. The processing apparatus of claim 6 further comprising a reuse invalidation buffer configured to include an aliased memory address accessed by an aliased load instruction within the reuse region.

8. The processing apparatus of claim 7 wherein the reuse invalidation buffer is further configured to include a pointer to the instance of the reuse region.

9. The processing apparatus of claim 6 wherein the second processor core is configured to execute the instructions from the reuse region, and to compare actual results to the reuse region instance output information.

10. The processing apparatus of claim 5 wherein the first processor core comprises a persistent register file and a shadow register file.

11. The processing apparatus of claim 10 wherein the second processor core comprises a local register file configured to receive information from the thread structure.

12. The processing apparatus of claim 5 further comprising a write-back buffer coupled to the first processor core, the write-back buffer being configured to store speculative results received from the first processor core.

13. The processing apparatus of claim 5 wherein the processing apparatus is a microprocessor.

14. A processing apparatus capable of speculative software execution, the apparatus comprising a checking processor core configured to execute software from a reuse region while a main processor core speculatively executes instructions occurring after the reuse region;

a reuse invalidation buffer having an entry that includes an aliased memory address and a pointer to a reuse region instance in a reuse buffer, such that the reuse region instance can be invalidated responsive to the entry;

a write-back buffer configured to hold speculative results from the speculative software execution.

15. A processing apparatus capable of speculative software execution, the apparatus comprising:

a main processor core;

a checking processor core configured to execute software from a reuse region while the main processor core speculatively executes instructions occurring after the reuse region, wherein the main processor core is configured to communicate reuse region information to the checking processor core in response to encountering a speculative reuse instruction;

a reuse invalidation buffer having an entry that includes an aliased memory address and a pointer to a reuse region instance in a reuse buffer, such that the reuse region instance can be invalidated responsive to the entry.

16. The processing apparatus of claim 15 further comprising a thread queue coupled between the main processor core and the checking processor core, the thread queue being configured to transfer the reuse region information from the main processor core to the checking processor core.

17. The processing apparatus of claim 16 wherein the thread queue is further configured to transfer reuse instance information including expected results to the checking processor core, and the checking processor core is further configured to compare the expected results with actual results.

18. A processing apparatus comprising:

a reuse buffer configured to hold a plurality of instances of reuse regions;

a reuse invalidation buffer configured to have a plurality of entries, each of the plurality of entries being configured to point to at least one of the plurality of instances of reuse regions held in the reuse buffer;

a processor core configured to search the reuse buffer for a matching instance when a reuse instruction is encountered, wherein each of the plurality of entries in the reuse invalidation buffer is configured to include an aliased memory address, each of the plurality of instances of reuse regions can be marked as valid or invalid within the reuse buffer, and the processing core is configured to mark as invalid an instance of a reuse region pointed to by an entry in the reuse invalidation buffer when the corresponding aliased memory address is updated.

19. A computer-implemented method, comprising:

identifying a reuse region within a software program to be annotated;

determining whether the reuse region is aliased;

if the reuse region is aliased, adding a speculative reuse instruction to the reuse region;

if the reuse region is not aliased, adding a pure reuse instruction to the reuse region.

20. A computer-implemented method, comprising:

identifying a reuse region within a software program to be annotated;

determining whether the reuse region is aliased, comprising determining whether the reuse region includes a memory load instruction that accesses a memory location that is capable of being updated outside of the reuse region;

if the reuse region is aliased, adding a speculative reuse instruction to the reuse region.

* * * * *